(No Model.) 2 Sheets—Sheet 1.

D. C. ANDREWS & J. F. SEERY.
HYDROCARBON BURNER.

No. 419,304. Patented Jan. 14, 1890.

WITNESSES:
Paul Jahst
C. Sedgwick

INVENTOR:
D. C. Andrews
J. F. Seery
BY
Munn & Co.
ATTORNEYS.

(No Model.) 2 Sheets—Sheet 2.

D. C. ANDREWS & J. F. SEERY.
HYDROCARBON BURNER.

No. 419,304. Patented Jan. 14, 1890.

WITNESSES:
Paul Johst
C. Sedgwick

INVENTOR:
D. C. Andrews
J. F. Seery
BY
Munn & Co
ATTORNEYS.

UNITED STATES PATENT OFFICE.

DAVID C. ANDREWS AND JAMES F. SEERY, OF NEW YORK, N. Y.

HYDROCARBON-BURNER.

SPECIFICATION forming part of Letters Patent No. 419,304, dated January 14, 1890.

Application filed August 1, 1889. Serial No. 319,373. (No model.)

*To all whom it may concern:*

Be it known that we, DAVID C. ANDREWS and JAMES F. SEERY, of the city and county of New York, in the State of New York, have invented a new and Improved Hydrocarbon-Burner, of which the following is a full, clear, and exact description.

Our invention relates to a burner designed more especially for burning hydrocarbon oils, but useful also for burning gases, and adapted more particularly for heating purposes in working furnaces of all kinds; and the invention has for its object to provide a simple, comparatively inexpensive, and efficient burner of this class, producing an intensely-hot and steady flame, which may be regulated at will as to heating-power as any particular service may require.

The invention consists in certain novel features of construction and combinations of parts of the burner, all as hereinafter described and claimed.

Reference is to be had to the accompanying drawings, forming a part of this specification, in which similar letters of reference indicate corresponding parts in all the figures.

Figure 1:
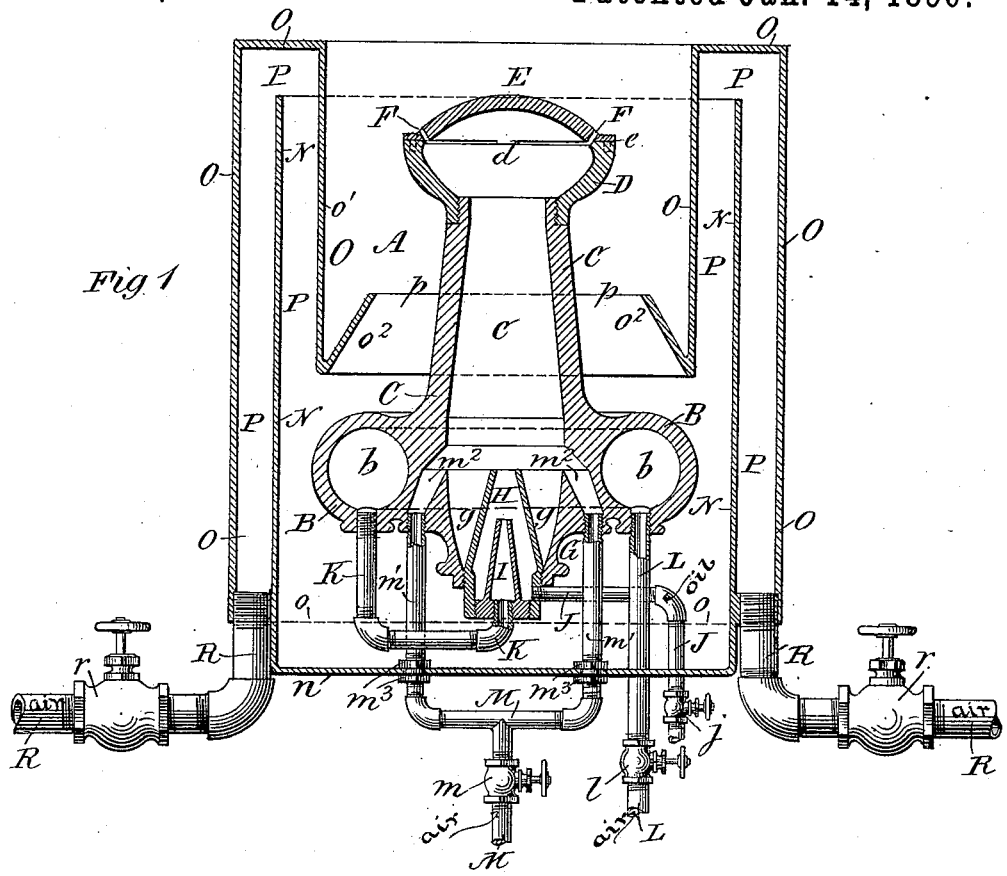
Figure 2:
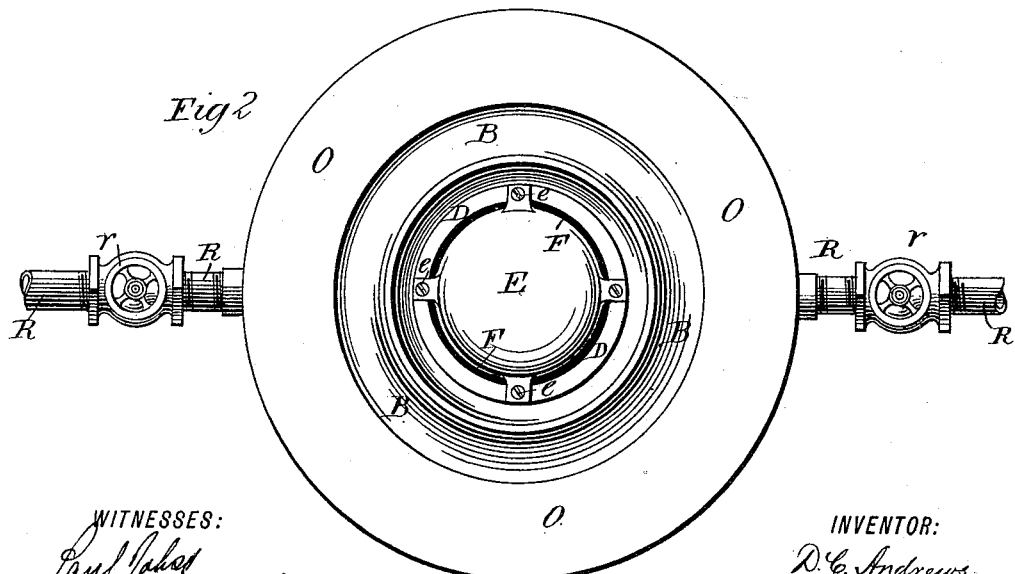
Figure 3:
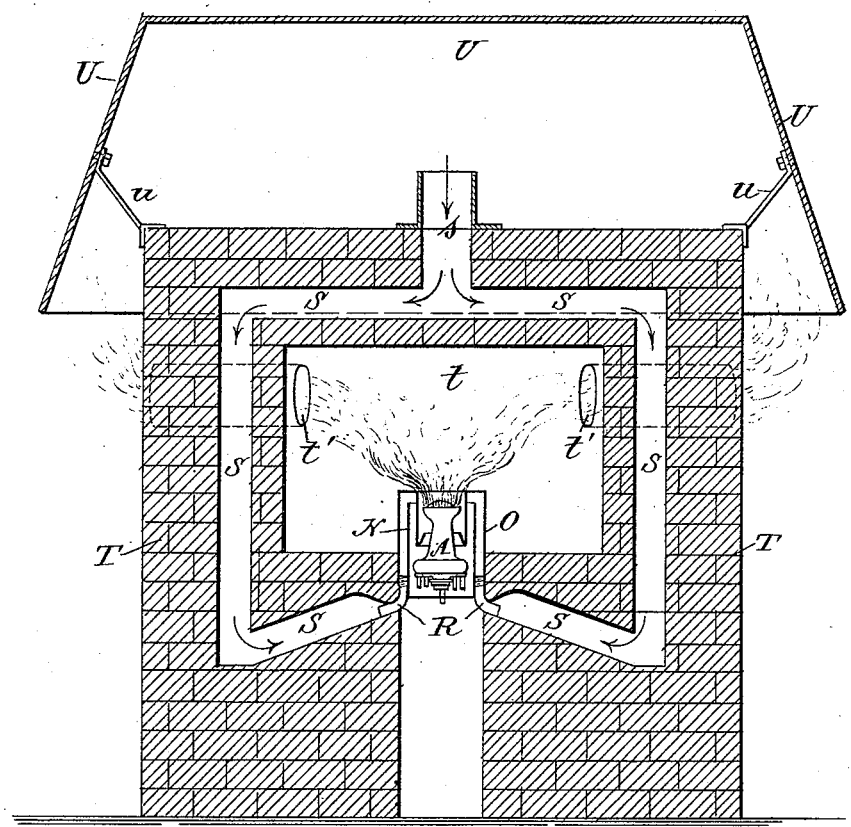
Figure 4:
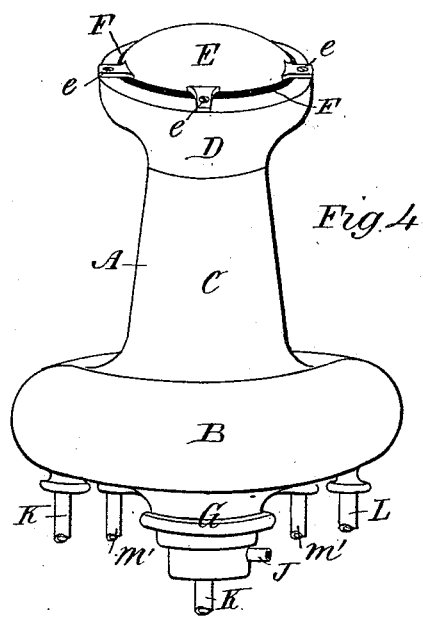

Figure 1 is a central vertical sectional elevation of our improved burner. Fig. 2 is a plan view thereof. Fig. 3 is a vertical sectional view illustrating the application of the burner to a heating or welding furnace, and Fig. 4 is a perspective view of the interior or body portion of the burner and its pipe-connections.

The body portion A of the burner is made with a lower preferably rounded part B, which has at its base or lower part a heating or vaporizing chamber $b$, preferably of annular form, and also has an upwardly-projecting and preferably tapered portion C, in which is formed the mixing-chamber $c$, a concaved cap-piece D, which may be cast with the parts B C, but which is shown connected to the part C by a screw-joint, and a concavo-convex deflecting and superheating plate E, which is a trifle smaller all around than the chamber of the cap D at the top, so as to provide an annular slit or opening F, through which the admixed hydrocarbon gases issue at the point of ignition of the burner. The plate E is held to the cap D by means of screws passed through lugs $e$ on the plate into the cap. A hollow pendent projection G on the bottom of the burner-body provides an interior chamber $g$, which opens freely to the mixing-chamber $c$ of the burner.

Into the lower end G of the burner body is screwed or otherwise suitably fitted a nozzle H, into which is screwed or fitted a smaller nozzle I, both nozzles being tapered upward to discharge into the mixing-chamber $c$. A pipe J, opening into the nozzle H, preferably at its base, is provided with a valve $j$, and leads to any suitable hydrocarbon-reservoir, which thus feeds oil to the burner as the adjustment of the valve will allow.

The above-named interior chamber $g$ is practically a part of the mixing-chamber; but said chamber $g$ may be dispensed with, in which case the nozzle H would be substituted by its full mechanical equivalent—viz., an upwardly-tapering bore, forming a nozzle or oil-feed opening at the base of the burner-body.

A pipe K, which opens through the closed lower end or plate of the nozzle I opposite or in line with the discharge ends of both nozzles I H, is also made to open into the heating-chamber $b$ of the burner, and preferably at a point diametrically opposite the point of connection of this pipe K with the chamber $b$ another pipe L opens into the chamber, and leads thence to any source of supply of compressed air preferably having a density of about three atmospheres, (more or less.) A valve $l$ in the pipe L regulates the supply of compressed air at will.

A pipe M, provided with a valve $m$, admits air or steam to the burner, preferably through two diametrically-opposite branches $m'$ $m'$, which open into a passage or passages $m^2 m^2$, formed in the body of the burner, and which open directly into the mixing-chamber $c$ about on a level with the discharge end of the oil-supply nozzle H. The branch pipes $m'$ are rigidly fixed by lock or jam nuts $m^3$ to the bottom wall $n$ of an open-topped casing or cylinder N, made preferably of cast metal and extending upward about to the top of the deflecting-plate E or flaming-point of the burner.

The pipes $m'$ thus sustain the burner-body within the casing N, through the bottom of which the pipes J L also pass.

An outer casing or chamber O, also preferably of cylindrical form and made of cast metal, is jointed by a lower inwardly-extending flange or rib $o$ (shown dotted in Fig. 1) with said casing N, and rises from the flange $o$ all around the casing N to a point above its top, whence the casing O is carried inward or backward all around to a line whence the wall of the casing drops or extends at $o'$ within the casing N about midway the length of the burner-body A, (more or less,) whence the casing O extends upward and inward at $o^2$ a short distance. The relative diameters of the two casings N O are such that there is formed between them a passage P, having communication with the main interior chamber of the casing N, in which the burner-body is supported, and so that the only outlet from the interior of the casing N toward the point of ignition of the burner is through the passage $p$ between the top of the inclined portion $o^2$ of the casing O and the part C of the body of the burner. Air may be supplied to the passage P, to be superheated therein on its way to the point of ignition of the burner, through pipes R, having valves $r$, and connected to the lower flange or wall $o'$ of the casing O, and leading from any suitable source of supply, as will be understood from Figs. 1 and 2 of the drawings. This air-supply to the pipes R may be heated in any approved way.

Fig. 3 of the drawings illustrates how two short air-inlet pipes R R are introduced into the inner ends of two flues S S, which are built into the wall of a welding or heating furnace T and traverse the combustion and heating chamber $t$ of the furnace, so that air admitted at the top opening $s$ to the flues S S will in its course through the flues, as indicated by the arrows, be superheated before it enters the pipes R R at the burner. The furnace is provided with one or more openings $t'$ in its walls, through which work to be heated is passed into the chamber $t$, to be in direct contact with the very hot flame from the burner. A hood U, which is sustained by brackets $u$ from the brick wall of the furnace, catches much of the heat issuing from the furnace-openings $t'$ and leads it to the air-inlet opening $s$, to partially heat the air-supply before it enters the flues S to be superheated therein on its way to the burner.

This furnace is shown as one example of the uses to which the burner is adapted; but for whatever purpose the burner is employed its operation will be practically the same, as follows: Hydrocarbon being admitted through the feed-pipe J to the interior of the nozzle H and compressed air being admitted to the heating or vaporizing chamber $b$ through the pipe L, this air will be highly superheated in the chamber, and by escaping through the pipe K into the inner nozzle I will induce a current which will draw the hydrocarbon from the nozzle H and carry it into the chamber $c$, where the hydrocarbon and superheated air will be intimately mixed, and whence the highly-inflammable gas and air mixture will be carried to the annular slit or opening F, where it will be ignited and will burn with an intensely-hot flame, which will highly heat the body of the burner and also the surrounding walls or casings N O thereof. Hence the air admitted to and through the pipes R R to maintain combustion at the point of ignition will be highly superheated by its contact with these casings as it moves around through the passage P and escapes in an inwardly-directed current through the passage $p$ toward the center of the top of the burner-body or toward the flaming-point of the burner; hence the air is most highly superheated when it commingles with the escaping hydrocarbon vapors or mixed gases issuing through the opening F in the head of the burner, and an intensely-hot flame is maintained. By admitting more or less atmospheric air to the passage P through the pipes R by opening their valves $r$ more or less the temperature of the burner-flame may be nicely regulated and maintained at any degree most suitable for any particular service—as, for instance, in pottery baking or glazing furnaces.

Should it be desirable or necessary in doing any special class of work to change the nature of the gaseous fuel, or, in other words, to make it a fixed gas of any desired quality and heating-power, this may be accomplished by admitting steam or air through the pipe M and passages $m^2$ to the mixing-chamber $c$, to commingle therein with the gas produced by admixture of the hydrocarbon and heated air fed through the pipes J K, respectively.

To use the burner to the best advantage with light oils—such as kerosene, naphtha, gasoline, &c.—we connect the oil-supply pipe directly to the pipe L, so that the oil is admitted directly to the heating-chamber $b$ of the burner, wherein it is vaporized or volatilized, and whence it passes in this condition through the pipe K to the inner nozzle I, and thence to the mixing-chamber $c$, wherein it will be commingled with air admitted in proper volume through the pipe M. In this case the valve $j$ of the pipe J will be closed.

To utilize the burner for service with either natural or manufactured gases, we attach the gas-supply pipe directly to the pipe L, which conveys the gas to the heating-chamber $b$, whence it passes through the pipe K and nozzle I to the mixing-chamber $c$, to commingle therein with air admitted through the pipe M on its way to the point of ignition of the burner, as will readily be understood.

We make special mention of the location of the heating-chamber $b$ below the point of ignition of the burner and not immediately at or above it. This peculiar location of the heating-chamber effects considerable economy in the working of the burner, as the heat always deflected downward from the flame and ordinarily lost is fully utilized to heat and decompose the air or light oils fed to the chamber $b$, and thence to the mixing-chamber.

Having thus described our invention, what we claim as new, and desire to secure by Letters Patent, is—

1. The combination, with a burner having a body portion provided with a heating or vaporizing chamber and a mixing-chamber, said heating-chamber located below the point of ignition of the burner, of two concentrically-arranged nozzles discharging into the mixing-chamber, a pipe supplying hydrocarbons or gases to one nozzle, a pipe supplying compressed air to the heating-chamber of the burner-body, and another pipe taking the air from said heating-chamber and delivering it to the other nozzle of the burner, substantially as described, for the purposes set forth.

2. The combination, with a burner having a body portion A, provided with a heating or vaporizing chamber $b$, located below the point of ignition of the burner, and an interior central mixing-chamber $c$, of a nozzle H, discharging into the mixing-chamber, a nozzle I, fitted centrally in the nozzle H and discharging into the mixing-chamber, an oil-supply pipe opening to the nozzle H, a pipe L, opening to the heating-chamber $b$, and a pipe K, connecting the chamber $b$ with the nozzle I, substantially as herein set forth.

3. The combination, in a burner, of a body portion A, provided with a heating or vaporizing chamber $b$, located below the point of ignition of the burner, an interior central mixing-chamber $c$, lower passages $m^2$, opening to the mixing-chamber, a nozzle H, discharging into the mixing-chamber, an oil-supply pipe opening to the nozzle H, a nozzle I, fitted centrally in the nozzle H and discharging into the mixing-chamber, a pipe L, opening to the heating-chamber $b$, a pipe K, connecting the chamber $b$ with the nozzle I, and a pipe M, communicating with the passages $m^2$ and the mixing-chamber, substantially as described, for the purposes set forth.

4. The combination, in a burner, of a body portion provided with a central mixing-chamber and having a heating or vaporizing chamber located below the point of ignition of the burner, two concentrically-arranged nozzles discharging into the mixing-chamber, a pipe supplying hydrocarbons or gases to one nozzle, a pipe supplying compressed air to the heating-chamber of the burner-body, another pipe taking air from said heating-chamber and discharging it into the other nozzle of the burner, a casing or jacket inclosing the burner-body at the bottom and sides and providing side walls forming a sinuous air-superheating passage having an outlet toward the point of ignition of the burner, and air-inlets to said casing, substantially as described, for the purposes set forth.

5. The combination, in a burner, of a body portion A, provided with a central mixing-chamber $c$ and having a heating or vaporizing chamber $b$, located below the point of ignition of the burner, two concentrically-arranged nozzles H I, discharging into the mixing-chamber, an oil-supply pipe opening to the nozzle H, a pipe L, opening to the chamber $b$, a pipe K, connecting the chamber $b$ with the nozzle I, a casing N O, arranged at the bottom and sides of the burner-body and providing a sinuous air-passage P $p$, and air-inlets to the passage P, substantially as described, for the purposes set forth.

6. The combination, in a burner, of a body portion A, provided with a central mixing-chamber $c$ and having a heating or vaporizing chamber $b$, located below the point of ignition of the burner, passages $m^2$ in the body opening to the mixing-chamber, two concentrically-arranged nozzles H I, discharging into the mixing-chamber, an oil-feed pipe J, opening to the nozzle H, a pipe L, opening to the heating-chamber $b$, a pipe K, connecting the chamber $b$ with the nozzle I, a pipe M, communicating with the body-passages $m^2$ and the mixing-chamber, a casing N O, ranging at the bottom and sides of the burner-body and providing a sinuous air-passage P $p$, and valved air-inlets to the passage P, all constructed and arranged for operation substantially as described, for the purposes set forth.

7. A burner-body having a central mixing-chamber $c$, a heating or vaporizing chamber $b$ at the base and outside of the mixing-chamber, and two concentrically-arranged bottom nozzles or openings adapted for reception and discharge of a hydrocarbon and hot air, substantially as described, for the purposes set forth.

DAVID C. ANDREWS.
JAMES F. SEERY.

Witnesses:
ALEX. T. STEWART,
ELLIS OWEN.